(12) United States Patent
Abe et al.

(10) Patent No.: US 6,656,567 B1
(45) Date of Patent: Dec. 2, 2003

(54) ADHESIVE SHEET AND ADHESIVE SHEET APPLIED STRUCTURE

(75) Inventors: Junji Abe, Tsuruoka (JP); Hidetoshi Abe, Tendo (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/700,016

(22) PCT Filed: Apr. 30, 1999

(86) PCT No.: PCT/US99/09623

§ 371 (c)(1), (2), (4) Date: Nov. 3, 2000

(87) PCT Pub. No.: WO99/58620

PCT Pub. Date: Nov. 18, 1999

(51) Int. Cl.[7] .............................. D06N 7/04; B32B 3/00; B32B 27/00
(52) U.S. Cl. ...................... 428/141; 428/142; 428/143; 428/144; 428/166; 428/198; 404/14
(58) Field of Search ................. 428/141, 142, 428/143, 144, 166, 198; 404/14

(56) References Cited

U.S. PATENT DOCUMENTS

| | | | |
|---|---|---|---|
| 4,299,874 A | * 11/1981 | Jones et al. | 428/143 |
| 5,514,122 A | * 5/1996 | Morris et al. | 604/387 |
| 6,107,222 A | * 8/2000 | Joseph et al. | 442/412 |

FOREIGN PATENT DOCUMENTS

| | | | |
|---|---|---|---|
| JP | 2-32180 | 2/1990 | C09J/7/02 |
| JP | 2503717 | 4/1996 | B32B/3/30 |
| WO | WO 94/22971 | 10/1994 | C09J/7/02 |
| WO | WO 96/11116 | 4/1996 | B44C/1/10 |
| WO | WO 97/20008 | 6/1997 | C09J/7/02 |
| WO | WO 98/08909 | 3/1998 | C09J/7/02 |
| WO | WO 98/18878 | 5/1998 | C09J/7/02 |

* cited by examiner

*Primary Examiner*—Harold Pyon
*Assistant Examiner*—Patricia L. Nordmeyer
(74) *Attorney, Agent, or Firm*—Carolyn V. Peters

(57) ABSTRACT

An adhesive sheet comprises a film substrate layer, a channel breathing layer and a breathing adhesive layer. The channel breathing layer has a plurality of convex parts and a concave part interposed between the convex parts that forms a channel communicating with the outside. When the adhesive sheet is applied to an adherend, gas generated from the adherend passes through the channel and swelling of the adhesive sheet is avoided.

2 Claims, 1 Drawing Sheet

ADHESIVE SHEET AND ADHESIVE SHEET APPLIED STRUCTURE

TECHNICAL FIELD OF THE INVENTION

The present invention relates to an adhesive sheet to be adhered on a rough surface which is a surface having minute unevenness, and particularly, to an adhesive sheet to be adhered on a rough surface of a porous material.

BACKGROUND OF THE INVENTION

Mortar, concrete and the like are a porous material and the surface thereof is a rough surface having minute unevenness. When such a porous material used outdoors, rainwater is easily impregnated into inside. The rainwater impregnated into inside of the porous material is, thereafter, gradually evaporated from the surface of the porous material and released as a gas containing water.

When an adhesive sheet having no gas-permeability is disposed on the surface of such a porous material, a gas to be released from the surface of the porous material can not escape from the surface. As a result, the gas remains between the surface of the porous material and the adhesive layer of the adhesive sheet, and swelling of the adhesive sheet occurs.

Japanese Patent Application Laid-Open (JP-A) No. Hei 2-32,180 discloses an adhesive sheet for a mortar plate, slate plate and concrete surface. This adhesive sheet has excellent cushioning property and also relatively excellent adhesion to rough surface.

FIG. 1 is a cross-sectional view of an adhesive sheet of this prior art. This adhesive sheet has structure in which a colored layer 101, liquid blocking layer 102, non-woven fabric layer 103 and adhesive layer 104 are laminated. In use, the adhesive layer 104 adheres to the surface of a porous material such as a mortar plate and the like, on which are laminated the non-woven fabric layer 103, liquid blocking layer 102 and colored layer 101.

In the structure of this adhesive sheet, the non-woven fabric layer 103 is gas-permeable, however, the adhesive layer 104 and liquid blocking layer 102 have poor gas-permeability. Therefore, in such a structure, when a gas containing water is generated from an adherend composed a porous material, this gas resides between the surface of the adherend and the adhesive layer 104, and swelling of the adhesive sheet occurs.

Japanese Patent Application Laid-Open (JP-A) Nos. Hei 6-287,525, Hei B-113,768, Hei 9-157,606 and registered utility model No. 2,503,717 describe an adhesive sheet in which a plurality of convex parts having approximately the same height are disposed on the surface portion of an adhesive layer, and the adhesive layer is endowed with gas-permeability. Such an adhesive sheet can easily let air that has been took in between an adherend and adhesive sheet go, in use.

FIG. 2 is a cross-sectional view showing one example of such a conventional adhesive sheet. This adhesive sheet has structure in which a film substrate layer 201, and an adhesive layer having on the surface part of the layer a plurality of convex parts 203, 203' having approximately the same height, are laminated. In use, the convex parts 203, 203' of the adhesive layer 202 are adhered to the surface of the adherend, and on which is laminated the film substrate layer 201.

The adhesive layer, 202 has unevenness on the surface part of the layer.

Therefore, concave parts 204, 204' interposed by the convex parts 203, 203' do not adhere to the surface of the adherend and remain as spaces. The remaining spaces form on interface between the adherend and the adhesive layer a continuous channel communicating with outside. This continuous channel can effectively let a gas generated from the adherend go outside of the adhesive sheet. Therefore, in such a structure, even when a gas containing water is generated from an adherend composed of a porous material, swelling of the adhesive sheet does not occur.

However, when unevenness is formed on the surface of the adhesive layer, area on which the adhesive layer contacts with the surface of the adherend decreases. Therefore, adhesive force by which such an adhesive layer adheres to the adherend decreases as compared with an adhesive layer in which unevenness is formed on the surface, In particular, when adhesion is effected on rough surface having minute unevenness, the adhesive layer having unevenness on the surface can not obtain high adhesive force.

In addition, there is also an adhesive sheet in which an aluminum foil is disposed between a substrate layer and an adhesive layer, to suppress mechanically swelling of a film, as an adhesive sheet for concrete surface, namely as a marking film. One example is a marking film "Scotchcal™ film CQ-001" manufactured by Minnesota Mining and Manufacturing Company (3M) of St. Paul, Minn., USA.

However, this adhesive sheet does not have function which lets a gas generated from the concrete surface go.

SUMMARY OF THE INVENTION

The present invention solves the above-described conventional problems by providing an adhesive sheet in which swelling thereof does not occur since it can let a gas generated from an adherend composed of a porous material go outside of the adhesive sheet, and which exhibits high adhesive force to rough surface.

The present invention provides an adhesive sheet which comprises a film substrate layer; a channel breathing layer which has a plurality of convex parts on the surface part of the layer and in which a concave part interposed between said convex parts forms a continuous channel communicating with outside; and a breathing adhesive layer, laminated sequentially in the order.

EMBODIMENTS OF THE INVENTION

In this specification, the term "rough surface" means a surface having a lot of minute unevennes. For example the aforesaid rough surface include a surface of a porous material such as mortar, concrete and the like. Degree of unevenness, of the surface is defined as surface roughness, and it is prescribed, for example, in JIS B 0601 (1994), and a case in which arithmetic average roughness (Ra) when cut off value is 8 mm and evaluation length is 40 mm is about 20 to 100 μm, may be included in the "rough surface".

A preferable rough surface in the present invention is a rough surface which retains water and discharges water as a gas. For example, the surface of a porous material such as mortar, concrete and the like is included.

Figure 1:
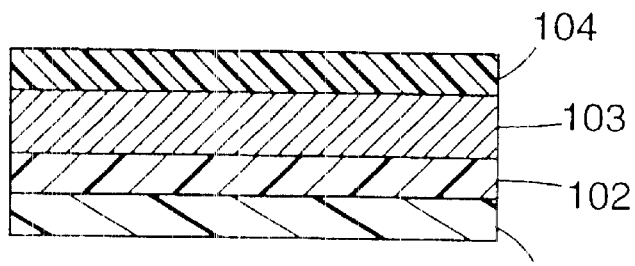
FIG. 1 is a cross-sectional view of a prior art construction described above.
Figure 2:
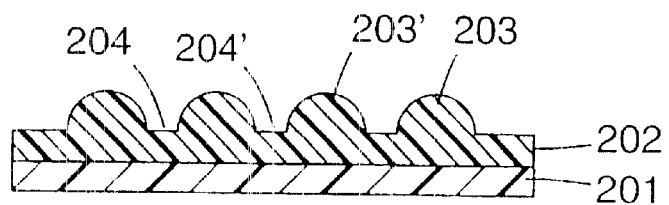
FIG. 2 is a cross-sectional view of a second prior art construction described above.
Figure 3:
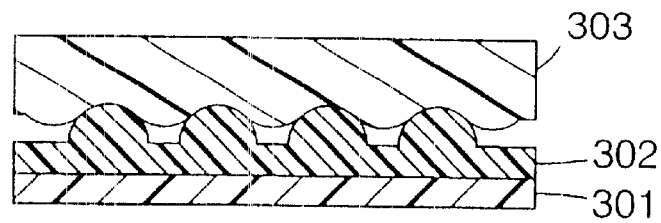
FIG. 3 is a cross-sectional view of a construction of the present invention.

FIG. 3 is a cross-sectional view showing one example of the adhesive sheet of the present invention. In this sheet, a film substrate layer 301, channel breathing layer 302 which has a plurality of convex parts having approximately the same height on the surface part of the layer and in which a concave part interposed between said convex parts forms a space and the space forms a continuous channel communicating with outside, and a breathing adhesive layer 303 are laminated sequentially in the order.

Film Substrate Layer

The film substrate layer is a layer which forms the surface of an adhesive sheet when the adhesive sheet is pasted on an adherend. The surface of the adhesive sheet may be colored, and provided with images such as literature, figure and the like.

The film substrate layer is usually adhered to the channel breathing layer by adhesiveness of the channel breathing layer itself, and also, may be adhered to the channel breathing layer by providing separately an adhesive layer between the film substrate layer and the channel breathing layer.

The film substrate layer may be formed from any material which is used as a substrate of a conventional adhesive sheet, and examples used include a metal film, plastic film and the like. Examples of the plastic used may include synthetic polymers such as polyvinyl chloride, polyester, polyurethane, polyacrylate and the like. The thickness of the film is usually from 10 to 1500 $\mu$m.

Channel Breathing Layer

The channel breathing layer has two main surfaces. Then, a major surface contacting with the film substrate layer is flat, and a major surface contacting with the breathing adhesive layer has a plurality of convex parts having approximately the same height. In general, the channel breathing layer is formed from a polymer material.

The convex part on one major surface of the channel breathing layer can be formed by a method in which a polymer material is subjected to an embossing process, a method in which a plurality of beads is contained into a resin composition in liquid form and the mixture is coated and solidified, and the like.

The channel breathing layer is preferably formed by coating slurry containing beads and a binder and solidifying the slurry. In general, the channel breathing layer is a coated film which is formed by coating slurry containing a bead having specific particle size and specific modulus of elasticity and a binder having specific modulus of elasticity, onto a film substrate layer, and drying it. By this, a channel having size and dimension effective for attaining excellent gas permeation property can be easily formed.

The slurry is usually prepared by mixing beads, binder, solvent and optionally various additives with a mixing apparatus such as a homo-mixer, planetary-mixer and the like, and dispersing uniformly the respective materials. As the additive, conventionally known compounds can be used in the range which does not lose the effects of the present invention. For example, a viscosity regulator, cross-liking agent, auxiliary solvent, de-foaming agent, leveling agent, ultraviolet-absorber, antioxidant, pigment and the like are included.

The modulus of elasticity of the bead is usually in the range from $1\times10^8$ to $1\times10^{13}$ dyn/cm$^2$, preferably from $1\times10^9$ to $1\times10^{12}$ dyn/cm$^2$. When the modulus elasticity is too low, there is a fear that a channel disappears and breathing property lowers in pasting the adhesive sheet or with the lapse of time after completion of the pasting, and on the other hand, when the modulus elasticity is too high, there is a fear that when an adhesive sheet is produced, the bead penetrates into the breathing adhesive layer and a channel having size and dimension effective for breathing can not formed.

The modulus of elasticity of the bead is usually compression modulus of elasticity, and compression modulus of elasticity is measured at 20° C. using RSA II viscoelasticity spectrometer manufactured by Rheometrics Corp. Namely, temperature dependence on modulus of elasticity is measured by changing temperature in the range from −80° C. to 150° C. while imparting compression strain of frequency of 1 rad/sec, and a value measured at 20° C. is regarded as compression modulus of elasticity.

As a material used for the bead, glass, acrylic resin and the like may be listed. The particle size of the bead is in the range usually from 50 to 3000 $\mu$m, suitably from 100 to 2000 $\mu$m. When the particle size is too small, there is a fear that a channel having size and dimension effective for breathing is not formed, and on the other hand, when the particle size is too large, there is a fear that coating becomes difficult and the whole adhesive sheet becomes heavy. The particle size of the bead (diameter) is usually a value measured using an image processing apparatus utilizing an optical microscope. As the bead, a solid or hollow sphere having one or more vacant pores can be used.

Specific examples of the bead include a glass bead "#120" manufactured by Gakunan Kouki Corp., a cross-linked polymethyl methacrylate bead "MBX-100" manufactured by Sekisui Plastics Co., Ltd., and the like.

As the binder, synthetic resins, such as an acrylic resin, urethane resin and the like can be used. The modulus of elasticity of the binder is usually in the range from $1\times10^9$ to $1\times10^{12}$ dyn/cm$^2$. In this range, it is possible that formation and maintenance of a channel for breathing is advantageously effected while maintaining flexibility of the whole adhesive sheet at preferable level. Specific examples of such a binder include an acrylic resin "HITALOID 5099" manufactured by Hitachi Kasei Co., Ltd., a urethane resin "SH-1011" anu Nippon Polyurethane Corp., and the like. Suitably, this resin is cross-linked using a cross-liking agent ("Coronate HX" manufactured by Nippon Polyurethane Corp.,), and the product is used as a binder.

On the other hand, compounding ratio by weight between the bead and the binder [(bead weight)/(binder solid component weight)] is usually in the range from 0.1×G to 4.0×G, suitably from 0.5×G to 1.2×G. G is the specific gravity of the bead. When the weight of the bead in the channel breathing layer is too low, the channel for breathing tends to be crushed due to so wide distance between the convex parts, and on the other hand, when it is too high, formation of the channel is difficult from the beginning due to so close arrangement of the convex parts.

When respective components of the slurry are mixed, if the concentration of solid components in the solution of the binder resin is previously controlled from 20 to 40% by weight, slurry having excellent coating property is obtained. Thus obtained slurry is suitably coated by a notch bar, round bar and the like since it contains the beads.

The maximal coating amount of the slurry varies depending on the raw material of the bead, and the like, and for example, in the case of slurry prepared under the above-described conditions, when the space of the notch bar is set at about 1.2 to 1.3 times of the maximum particle size of the bead, and the slurry is coated and dried, there is easily obtained a channel breathing layer having a dried coating weight in the range from 0.6 to 3.0 g/150 mm×100 mm. In the channel breathing layer having such a coating weight, breathing ability is effectively enhanced. From this point of view, the more preferable range of coating weight is from 0.8 to 1.5 g/150 mm×100 mm.

For the purpose of improving adhesion between the channel breathing layer and the porous adhesive layer, it is suitable that an aluminum chelate is added to the slurry. Specific examples of the aluminum chelate include "AD-5A" manufactured by Souken Kagaku Corp. The amount added of the aluminum chelate is, for example, in the range usually from 0.4 to 20.0 per 100 parts by weight of the binder.

The convex part of one major surface of the channel breathing layer may be formed by emboss processing of a polymer material. In this processing, it is preferable to use as the polymer material a polyolefin, polyvinyl chloride, polyester, silicone, acrylic resin, polyurethane, synthetic rubber (NBR, SBR and the like), and the like. For example, it is also possible that a sheet of such a polymer material is subjected to emboss processing to form a uneven sheet having uneven structure, and the resulted uneven sheet is formed and this is used as a film substrate layer and simultaneously as a channel breathing layer.

In this case, it is possible, for example, that the height of the convex part is from 0.1 to 5 mm, the distance between the convex parts is from 0.1 to 10 mm, and the perpendicular sectional form of the convex part may be polygon such as trapezoid and rectangular parallelopiped, or semicircle.

Breathing Adhesive Layer

The breathing adhesive layer is suitably a layer composed of dish cloth impregnated with an adhesive. By this, it is possible to effectively enhance adhesion to the tough surface of a porous material such as concrete, mortar and the like. The dish cloth means usually nonwoven fabric, woven fabric or knitted fabric. The density of the dish cloth is usually from 5 to 50 g/m$^2$. The fiber (material) of the dish cloth is usually rayon, polyester, acryl and the like.

The adhesive is, for example, a synthetic polymer-based adhesive such as an acrylic polymer, polyurethane, polyolefin, polyester and the like; or a rubber-based adhesive such as natural rubber and the like. The amount impregnated of the adhesive is usually in the range from 10 to 400 g/m$^2$, suitably from 20 to 200 g/m$^2$. When the amount impregnated is too low, there is a fear that the adhesive force decreases, and on the other hand, when the amount impregnated is too high, there is a fear that the breathing ability decreases. The molecular weight of the adhesive polymer of the adhesive may advantageously be in the range wherein given adhesive property is exhibited, and usually in the range from 10,000 to 100,000 in terms of weight-average molecular weight.

As the layer composed of such dish cloth impregnated with an adhesive, a commercially available adhesive-double coated tape or sheet can also be used. As concrete examples of such a commercially available product, pressure sensitive adhesive-double coated tapes "Y9448H", "Y9448S" manufactured by Minnesota Mining and Manufacturing Company can be listed. Both of them are a product obtained by impregnating rayon nonwoven fabric having a density of 14 g/m$^2$ with an acrylic adhesive at a ratio of 70 g/m$^2$, and has a thickness of about 160 μm.

The thickness of the porous adhesive layer is in the range of usually from 10 to 500 μm. suitably from 40 to 250 μm. When the thickness is too small, there is a fear that adhesive force decreases, and on the other hand, when the thickness is too large, there is a fear that breathing ability decreases.

Production of Adhesive Sheet

The adhesive sheet for rough surface of the present invention is produced by forming a channel breathing layer on one major surface of a film substrate layer and disposing a breathing adhesive layer on the surface of the channel breathing layer.

If the above-described slurry containing beads and a binder is used. it is possible that the channel breathing layer is easily formed on major surface of the film substrate layer. Namely, the slurry is coated on the film substrate layer and dried to form a channel breathing layer. As the coating means, known means such as knife coater, roll coater, die coater, bar coater and the like can be used. The drying is usually conducted at a temperature from 60 to 180° C. The drying time is usually from several decades seconds to several minutes.

Then, the breathing adhesive layer is disposed on the surface of the channel breathing layer, and adhered. Since a plurality of convex parts having approximately the same height are formed on the surface of the channel breathing layer, the breathing adhesive layer adheres to this convex part and a concave part interposed by the convex parts remains as space. As a result, after the breathing adhesive layer is disposed on the surface of the channel breathing layer, this space forms a continuous channel communicating with outside.

Further, for protecting the adhesive layer, a silicone-treated liner is usually disposed on the breathing adhesive layer.

Action

Figure 4:
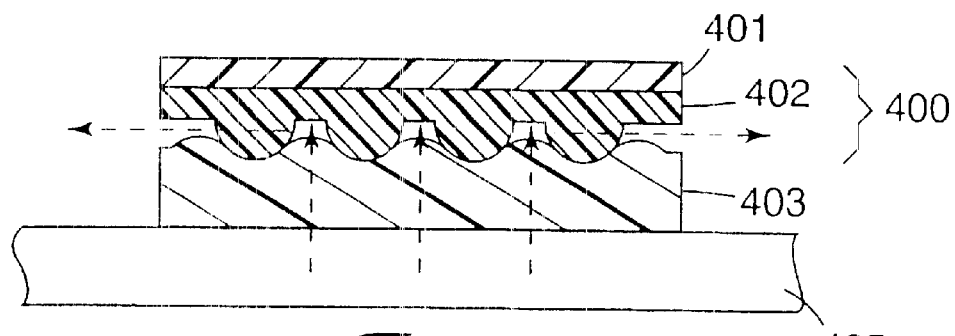
FIG. 4 is a cross-sectional view of a second construction of the present invention.

FIG. 4 is a cross-sectional view showing one example of an adhesive sheet applied structure comprising an adherend 405 composed of a porous material having rough surface and an adhesive sheet for rough surface 400 of the present invention. The adhesive sheet for rough surface 400 comprises a film substrate layer 401, channel breathing layer 402, and breathing adhesive layer 403.

In the adhesive sheet for rough surface 400 of the present invention, a channel communicating with outside of the adhesive sheet exists on the interface between the breathing adhesive layer 403 and the channel breathing layer 402. Therefore, when a gas is generated from an adherend such as concrete, mortar and the like, this gas passes through the breathing adhesive layer reaching to the channel easily, and can easily escape through this channel to outside.

In FIG. 4, an arrow represented by a broken line schematically shows a route through which a gas generated from an adherend passes into outside of the adhesive sheet. Therefore, in the adhesive sheet for rough surface 400 of tie present invention, even if a gas is generated from the adherend, the gas does not remain between the adherend and the adhesive layer, and apparent failure due to swelling of the adhesive sheet does not occur.

On the other hand, since the adhesive layer is a breathing adhesive layer having flat adhesive surface, transfer of the gas generated from the adherend reaching to the channel is not prevented, and sufficient adhesion area for the adherend can be secured. Therefore, the sheet can be suitably applied to use for which relatively high adhesive force under normal condition (for example, 3 kgf/25 mm or higher) is required.

The "adhesive force under normal condition" is defined as releasing force which is measured by pasting the sheet on the surface of an adherend under conditions of 20° C. and 65% RH, leaving under the conditions for 48 hours, then measuring at a releasing speed of 300 mm/minute and a releasing angle of 180°. In the adhesion structure of the present invention, adhesive force under normal condition to a body having surface to be adhered formed from concrete or mortar is in the range usually from 3 to 7 kgf/25 mm.

EXAMPLES

The following examples further illustrate the present invention, but do not limit the scope thereof.

Example 1

An acrylic resin "HITALOID 5099" manufactured by Hitachi Kasei Co., Ltd. was dissolved into a solvent "Solvesso #100" manufactured by Exxon Corp. to obtain a 25% by weight resin solution, and to this was added "a glass bead for blast #120 (particle size 125 to 149 $\mu$m, specific gravity 2.5)" manufactured by Gakunan Kouki Corp., and the mixture was stirred by a homo-mixer to obtain slurry. The amount compounded was regulated so that the glass bead and the acrylic resin were in ratio by weight shown in Table 1.

The resulted slurry was coated using notch bars onto the surface of a polyvinyl chloride (PVC) film having a thickness of 100 $\mu$m. The space of the notch bars was set at 180 $\mu$m. The amount coated is shown in Table 1. The coated slurry was dried for 2 minutes at 65° C. and additionally for 5 minutes at 155° C. to form a channel breathing layer. On this was laminated a pressure sensitive adhesive-double coated tape "Y9448H" manufactured by Minnesota Mining and Manufacturing Company, to obtain an adhesive sheet.

Then, the abilities of the resulted adhesive sheet were evaluated according to the following methods. The results are shown in Table 2.

Adhesive Force Under Normal Condition

An adhesive sheet cut into 150 mm×25 mm was pasted onto a mortar plate (150 mm×70 mm×10 mm) manufactured by Nippon Test Panel Corp. under conditions of 20° C. and 65% RH, and left for 48 hours under the same conditions, then, the releasing force was measured. The releasing speed was 300 mm/minute, and the releasing angle was 180°.

Breathing Ability

An adhesive sheet cut into 150 mm×50 mm was pasted onto a mortar plate manufactured by Nippon Test Panel Corp. under conditions of 20° C. and 65% RH, and whether there was a change in appearance due to swelling or not was observed according to the following conditions. The evaluation standard is shown below.

- ● (good): The test sample was left for 24 hours at room temperature, then to immersed in water of 40° C. for 7 days to find no swelling.
- ▼ (permissible): The test sample was left for 24 hours at room temperature, then immersed in water of 20° C. for 7 days to find no swelling, however, the test sample was left for 24 hours at room temperature, then immersed in water of 40° C. for 7 days to find swelling.
- X (not permissible): Swelling was observed at any of the above-described conditions.

Followability to Rough Surface

A transparent acrylic plate having a concave part having a width of 10 mm and a depth of 60 $\mu$m was prepared as an adherend, and on this was pasted an adhesive sheet cut into 150 mm×25 mm so that the concave of the adherend was buried. For the pasting, a 2 kg roller was used and the components were pressed for adhesion by up and down movement once. For the evaluation, the length where the breathing adhesive layer did not contact with the adherend at uneven part around the concave part of the adherend was measured. The smaller value of this length indicates more excellent followability to rough surface, and 0.5 mm is suitable.

Examples 2 to 4

Adhesive sheets were prepared in the same manner as in Example 1 except that the amount blended of the bead and binder, and the amount coated of the slurry were changed as shown in Table 1, and the abilities were evaluated. The evaluation results are shown in Table 2.

Example 5

An acrylic resin "HITALOID 5099" manufactured by Hitachi Kasei Co., Ltd. was dissolved into a solvent "Solvesso #100" manufactured by Exxon Corp. to obtain a 25% by weight resin solution, and to this was added "a glass bead for blast #180 (particle size 88 to 105 $\mu$m, specific gravity 2.5)" manufactured by Gakunan Kouki Corp., and the mixture was stirred by a homo-mixer to obtain slurry. The amount compounded was regulated so that the glass bead and the acrylic resin were in ratio by weight shown in Table 1.

The resulted slurry was coated using notch bars onto the surface of a polyvinyl chloride (PVC) film having a thickness of 100 $\mu$m. The space of the notch bars was set at 180 $\mu$m. The amount coated is shown in Table 1. The coated slurry was dried for 2 minutes at 65° C. and additionally for 5 minutes at 155° C. to form a channel breathing layer. On this was laminated a pressure sensitive adhesive-double coated tape "Y9448H" manufactured by Minnesota Mining and Manufacturing Company, to obtain an adhesive sheet.

Then, the abilities of the resulted adhesive sheet were evaluated in the same manner as in Example 1. The results are shown in Table 2.

Example 6

An adhesive sheet was prepared in the same manner as in Example 5 except that the amount blended of the bead and binder, and the amount coated of the slurry were changed as shown in Table 1 and the space of the notch bars was set at 130 $\mu$m, and the abilities were evaluated. The evaluation results are shown in Table 2.

Example 7

An acrylic resin "HITALOID 5099" manufactured by Hitachi Kasei Co., Ltd. was dissolved into solvent "Solvesso #100" manufactured by Exxon Corp. to obtain a 25% by weight resin solution, and to this was added "a cross-linked polymethyl methacrylate bead MBX-100 (particle size 102 to 142 $\mu$m, specific gravity 1.2)" manufactured by Sekisui Plastics Co., Ltd., and the mixture was stirred by a homo-mixer to obtain slurry. The amount compounded was regulated so that the glass bead and the acrylic resin were in ratio by weight shown in Table 1.

The resulted slurry was coated using notch bars onto the surface of a polyvinyl chloride (PVC) film having a thickness of 100 $\mu$m. The space of the notch bars was set at 180 $\mu$m. The amount coated is shown in Table 1. The coated slurry was dried for 2 minutes at 65° C. and additionally for 5 minutes at 155° C. to form a channel breathing layer. On this was laminated a pressure sensitive adhesive-double coated tape "Y9448H" manufactured by Minnesota Mining and Manufacturing Company, to obtain an adhesive sheet.

Then, the abilities of the resulted adhesive sheet were evaluated in the same manner as in Example 1. The results are shown in Table 2.

Comparative Example 1

A conventional marking film ("Scotchcal film CQ-001" manufactured by Minnesota Mining and Manufacturing Company) was used, having structure in which an adhesive layer containing an acrylic adhesive polymer as a main component was closely adhered to a film substrate layer (PVC film having a thickness of 100 μm) directly. The abilities of this adhesive sheet was evaluated in the same manner as in Example 1. The results are shown in Table 2.

TABLE 1

|  | Bead particle size (μm) | Compounding ratio (ratio by weight of solid component) | Amount coated (g/150 mm × 100 mm) |
|---|---|---|---|
| Ex. 1 | 125 to 149 | 1.50 | 0.81 |
| Ex. 2 | 125 to 149 | 2.00 | 1.06 |
| Ex. 3 | 125 to 149 | 2.50 | 1.30 |
| Ex. 4 | 125 to 149 | 1.00 | 0.60 |
| Ex. 5 | 88 to 105 | 1.00 | 0.67 |
| Ex. 6 | 88 to 105 | 1.50 | 0.60 |
| Ex. 7 | 102 to 142 | 0.96 | 0.74 |

TABLE 2

|  | Adhesive force under normal conditions (kgf/25 mm) | Breathing property | Followability to surface (mm) |
|---|---|---|---|
| Ex. 1 | 3.9 | ● | 0.2 |
| Ex. 2 | 4.1 | ● | 0.2 |
| Ex. 3 | 4.3 | ● | 0.2 |
| Ex. 4 | 5.1 | ▲ | 0.2 |
| Ex. 5 | 5.2 | ▲ | 0.2 |
| Ex. 6 | 4.7 | ▲ | 0.2 |
| Ex. 7 | 4.0 | ▲ | 0.2 |
| C. Ex. 1 | 2.5 | x | 1.0 |

In every example, excellent breathing property was obtained by the effect of the channel breathing layer (channel formation). Among other, it was found that the sheets in Examples 1 to 3 had particularly excellent breathing property, and could stand use under more strict conditions than sheets in Examples 4 to 7.

Balance between the bead particle size, compounding ratio of the bead with the binder, and the weight coated, is important. As one criterion for obtaining excellent breathing ability, it is suitable that the amount coated of slurry is 0.8 g/150 mm×100 mm or more. Further, when pasted on rough surface, the sheet of the examples could effectively adhere to rising part in the unevenness of the adherend and exhibited excellent followability to rough surface since the adhesive layer was flexible and thicker as compared with the conventional marking film.

Example 8

A sheet composed of NRB rubber was first subjected to emboss processing under conditions of 177° C., 50 kg/cm$^3$ and 3 minutes duration to form a uneven sheet having uneven structure. An adhesive sheet of this example was formed in the same manner as in Example 1 except that this uneven sheet was used as a film substrate layer and simultaneously as a channel breathing layer, and the use of a top film was omitted.

The uneven sheet had (i) a film substrate layer (thickness: 0.5 mm) and (ii) a plurality of convex parts bonded integrally to the film substrate layer. The height of the of the convex part was 1.0 mm, the distance between the convex parts was 0.5 mm and the perpendicular sectional form of the convex part was trapezoid (the side adhered to the breathing adhesive layer corresponding to the lower bottom of the trapezoid.). The adhesion area (total) of the convex parts was about 44%.

The evaluation of the adhesive sheet of this example was conducted in the same manner as in Example 1. As a result, the adhesive force under normal conditions, breathing ability evaluation and followability to tough surface were equivalent to those in Example 1.

Usefulness of the Invention

There was provided an adhesive sheet in which swelling of the adhesive sheet does not occur since a gas generating from an adherend composed of a porous material can be let go outside of the adhesive sheet, and which exhibits high adhesion to rough surface.

What is claimed is:

1. An adhesive sheet which comprises a film substrate layer; a channel breathing layer comprising a binder having a modulus of elasticity in the range from $1\times10^9$ to $1\times10^{12}$ dyn/cm$^2$, which has a plurality of convex parts on the surface part of the layer and in which a concave part interposed between said convex parts forms a channel communicating with outside; and a breathing adhesive layer, laminated sequentially in that order such that gas from an adherend can pass through the breathing adhesive layer and escape through the channel to outside wherein said channel breathing layer further comprises a plurity of beads having a modulus of elasticity in the range from $1\times10^8$ to $1\times10^{13}$ dyn/cm$^3$.

2. An adhesive sheet applied structure comprising an adherend composed of a porous material having rough surfaces and the adhesive sheet of the claim 1 adhered to the rough surface.

* * * * *

UNITED STATES PATENT AND TRADEMARK OFFICE
CERTIFICATE OF CORRECTION

PATENT NO. : 6,656,567 B1
DATED : December 2, 2003
INVENTOR(S) : Abe, Junji

It is certified that error appears in the above-identified patent and that said Letters Patent is hereby corrected as shown below:

Column 1,.
Line 14, after "material" insert -- is --.
Line 44, after "composed" insert -- of --.
Line 55, delete "took" and insert in place thereof -- taken --.

Column 2,
Line 1, should not be the beginning of a new paragraph.
Line 44, delete "the" and insert in place thereof -- that --.
Line 58, delete "unevennes" and insert in place thereof -- unevenness --.
Line 61, delete "," after "unevenness".
Line 62, delete "prescribed" and insert in place thereof -- described --.

Column 3,
Line 11, delete "the" and insert in place thereof -- that --.
Line 58, delete "cross-liking" and insert in place thereof -- cross-linking --.

Column 4,
Line 31, delete "," after "resin".
Line 40, delete "anu" and insert in place thereof -- manufactured by --.
Line 41, delete "cross-liking" and insert in place thereof -- cross-linking --.

Column 5,
Line 31, delete "tough" and insert in place thereof -- rough --.
Line 61, delete "." after "$\mu$m".

Column 6,
Line 5, delete "." after "used".
Line 44, delete "tie" and insert in place thereof -- the --.

Column 7,
Line 40, delete "to" after "then".

Column 9,
Line 34, delete "other" and insert in place thereof -- others --.

UNITED STATES PATENT AND TRADEMARK OFFICE
CERTIFICATE OF CORRECTION

PATENT NO.     : 6,656,567 B1
DATED          : December 2, 2003
INVENTOR(S)    : Abe, Junji It is certified that error appears in the above-identified patent and that said Letters Patent is hereby corrected as shown below:

Column 10,
Line 12, delete the second instance "of the".
Line 22, delete "tough" and insert in place thereof -- rough --.
Line 41, delete "plurity" and insert in place thereof -- plurality --.

Signed and Sealed this

Fifteenth Day of June, 2004

JON W. DUDAS
*Acting Director of the United States Patent and Trademark Office*